United States Patent [19]
Kok

[11] Patent Number: 5,936,823
[45] Date of Patent: Aug. 10, 1999

[54] CIRCUIT ARRANGEMENT FOR PROTECTING A SUBSCRIBER CIRCUIT OF A TELECOMMUNICATION SWITCHING SYSTEM

[75] Inventor: Jan Kok, Munich, Germany

[73] Assignee: Siemens Aktiengesellschaft, Munich, Germany

[21] Appl. No.: 08/769,817

[22] Filed: Dec. 19, 1996

[30] Foreign Application Priority Data

Dec. 21, 1995 [DE] Germany ............... 195 48 063

[51] Int. Cl.⁶ .................................................. H02H 3/22
[52] U.S. Cl. ........................................ 361/119; 361/91
[58] Field of Search .......................... 361/56, 91, 111, 361/118, 119; 379/412

[56] References Cited

U.S. PATENT DOCUMENTS 4,661,979  4/1987  Jakab ............................ 379/412
5,572,397  11/1996  Smith et al. ...................... 361/119

FOREIGN PATENT DOCUMENTS 0 311 580 A1  12/1989  European Pat. Off. .

*Primary Examiner*—Sally C. Medley
*Attorney, Agent, or Firm*—Hill & Simpson

[57] ABSTRACT

Circuit arrangement for protecting a subscriber circuit of a telecommunication system for the balanced-to-ground connection of a subscriber line to which a ringing voltage source is connected unbalanced to ground via an electromechanical or electronic switch upon simultaneous disconnection from the subscriber circuit for call signalling against inductive over-voltages that occur upon reconnection to the subscriber line, characterized by a two-way threshold circuit (D) with symmetrical pass/stop characteristic whose threshold voltage is higher than the peak voltage of the ringing voltage source (UGR) that is connected between the leads (a, b) of the subscriber line.

5 Claims, 2 Drawing Sheets

CIRCUIT ARRANGEMENT FOR PROTECTING A SUBSCRIBER CIRCUIT OF A TELECOMMUNICATION SWITCHING SYSTEM

BACKGROUND OF THE INVENTION

The present invention is directed to a circuit arrangement for protecting a subscriber circuit.

The present invention relates to a subscriber line to which a ringing voltage source is connectible unbalanced to ground via an electromechanical or electronic switch with simultaneous separation from the subscriber circuit for the purpose of signalling an outgoing call. What is referred to as an asymmetrical call occurs in the case of external call feed.

Modern subscriber line circuits are constructed of VLSI components and require a protective circuit against over-voltages. Such over-voltages can occur due to inductive and capacitative couplings to other lines, due to direct mains contact of the subscriber line circuit or, due to atmospheric discharges.

For this reason over-voltage protective circuits are provided that are connected between the leads of the subscriber line circuit and effect a low-impedance dissipation to grounded potential. Their points of connection must lie such that they cannot be triggered by the ringing voltage source in case of a connection, since peak values of the ringing voltage would otherwise cause them to respond.

Noise voltages that arise due to the switching of inductive loads must also be considered in addition to the already above mentioned over-voltages. This happens due to a reconnection of the subscriber line circuit upon simultaneous disconnection of the ringing signal generator ensues in conjunction with the call signalling upon transition from the ringing phase in which the subscriber line is disconnected from the subscriber line circuit and applied to the ringing generator to a pause in the call or, respectively, the end of the call. The over-voltages thereby occurring can lead to malfunctions of the component parts of the subscriber line circuit or other units of the telecommunication system.

It is known to keep such disturbances due to the switching of ringing loads low in that the zero-axis crossing of the ringing current is detected with detector circuits and the disconnect of the ringing load is designationally undertaken at this point in time.

However, such detector circuits cannot offer complete protection against noise voltages when switching inductive loads. In this respect, the identification of the zero-axis crossing is affected by tolerances. Also the relays employed for switching have delay times on the order of magnitude of 8 ms through 10 ms. As a result the switching does not ensue exactly at the time of the identified zero-axis crossing, so that the occurrence of considerable voltages arise that can lie on the order of magnitude of up to a few kV.

FIG. 1 shows a prior art subscriber circuit in the form of the modules SLIC and SLAC. The module SLIC (Subscriber Line Interface Circuit) essentially represents the interface to the subscriber line circuit. The realization of the two-wire/four-wire transition, the analog-to-digital conversion or, respectively, digital-to-analog conversion and the filtering essentially ensue in the module SLAC (Subscriber Line Audio Circuit).

The subscriber line is connected to the subscriber circuit with its leads a and b, this subscriber line serving the purpose of connection to a subscriber terminal equipment or, respectively, the impedance thereof, this being indicated in FIG. 1 by an impedance Z. The resistors Ra and Rb, which, for example, have a value of resistance of 50 Ohms, belong to the subscriber circuit and serve for limiting the current.

A relay K1 having a switchover contact k1$a$ lying in the a-lead of the subscriber line and a switchover contact k1$b$ lying in the b-lead serves the purpose of connecting a ringing current generator UGR that is asymmetrically applied to the a-lead and the b-lead in series circuit with the feed voltage source UB in the ringing phase.

An over-voltage protection circuit OVP that is connected between the leads a and b of the subscriber line at that side of the contacts k1$a$, k1$b$ of the relay K1 facing toward the module SLIC. The circuit OVP forms two symmetrical discharge paths from these leads to grounded potential. The protective circuit OVP protects against the afore-mentioned over-voltages caused, for example, by atmospheric disturbances. The location of the connecting point assures that this circuit cannot respond due to the applied ringing voltage.

The over-voltages whose suppression is involved here arise upon reconnection of the subscriber line to the subscriber circuit using the relay K1 after this was disconnected therefrom during the ringing phase and connected to the circuit of the ringing generator UGR.

RC elements composed of resistors R1 and R2 and capacitors C1 and C2 are then connected via the relay contacts k1$a$ and k1$b$ as noise suppression measures in FIG. 1. This is a solution that requires four components per subscriber line, i.e. per subscriber, whereby the capacitors C1 and C2 of the RC elements must have high electric strength. What is also disadvantageous about this circuit measure is that the energy of the over-voltages is diverted to ground/battery via the over-voltage protection circuit OVP, this being undesirable because of the galvanic coupling to other function units or, respectively, the digital unit of the subscriber circuit itself via the connection to ground.

In the prior art solution of FIG. 2, an RC element (resistor R3, capacitor C3) is connected between the leads a and b of the subscriber line for noise suppression. Only two components per subscriber circuit are in fact required here and the above-recited coupling via the connection to ground is also eliminated. Since, however, the energy of the load inductance to be dissipated must be stored in the capacitor C3 of the RC element, this solution can only be employed in conjunction with the afore-mentioned disconnect during the zero-axis crossing of the ringing current and with relays having switching delays approaching zero since a capacitor having an unrealizably high capacitance value would otherwise be required. This solution is thus not cost beneficial and requires a great deal of space. Added thereto is that relays having such short delay times do not exist.

In the prior art solution of FIG. 3, varistors VA are connected parallel to the contacts k1$a$ and k1$b$. Only two components are thus required per subscriber circuit. However, a discharge of the energy stored in the inductance to ground/battery via the over-voltage protection circuit OVP also ensues here. In addition, varistors modify their original characteristics in an undefined way after being influenced by over-voltage, for example due to the afore-mentioned atmospheric disturbances. This is inadmissible particularly in view of the desired symmetry of the line lead branches. This characteristic of varistors also does not allow the RC element in the protective circuit of FIG. 2 to be replaced by a varistor.

The known protective measure employed according to FIG. 4 is comprised in the connection of the series circuit of two diacs between the leads a and b, whereby the junction of the two diacs lies at ground. This circuit is provided as a protective circuit for the ringing voltage generator UGR against over-voltages such as, for example, atmospheric disturbances. However, it also has the effect that it discharges energy still present in the inductance of the subscriber line or, respectively, of the subscriber terminal equipment to system ground when switching the relay. This, however, enables the afore-mentioned, undesirable galvanic coupling of the noise current onto other electronic function units.

SUMMARY OF THE INVENTION

It is an object of the present invention to comprise a cost-beneficial solution for the suppression of noise voltage in conjunction with the switching of inductive ringing loads that does not exhibit the disadvantages of the afore-mentioned, known solutions.

Accordingly, a two-way threshold circuit with symmetrical pass/stop characteristic whose threshold voltage is higher than the peak voltage of the ringing voltage source is connected between the leads of the subscriber line.

Compared to the known solutions discussed above, this has the advantage, first, that the energy stored in the inductive load is not discharged via ground/battery and, thus, the undesired galvanic couplings also do not occur. Further, the inventive solution can be realized with a single component part.

The transmission-oriented parameters, particularly the line symmetry, are not negatively influenced by the inventive circuit arrangement. Detector circuits for detecting the zero-axis crossings can be dispensed with given employment of the inventive circuit arrangement.

According to a further development of the present invention, the two-way threshold circuit can be realized in the form of a diac. Such components are available in technologies (SMD: Surface Mounted Device) that meet the high fabrication-related demands during assembly, particularly with respect to the solderability, this not being the case without further ado given protective circuits that use capacitors. Diacs also meet the high demands given lightning stresses.

Alternatively, two diodes with defined breakdown voltage that are connected anti-serially also come into consideration.

DESCRIPTION OF THE PREFERRED EMBODIMENTS

Figure 1:
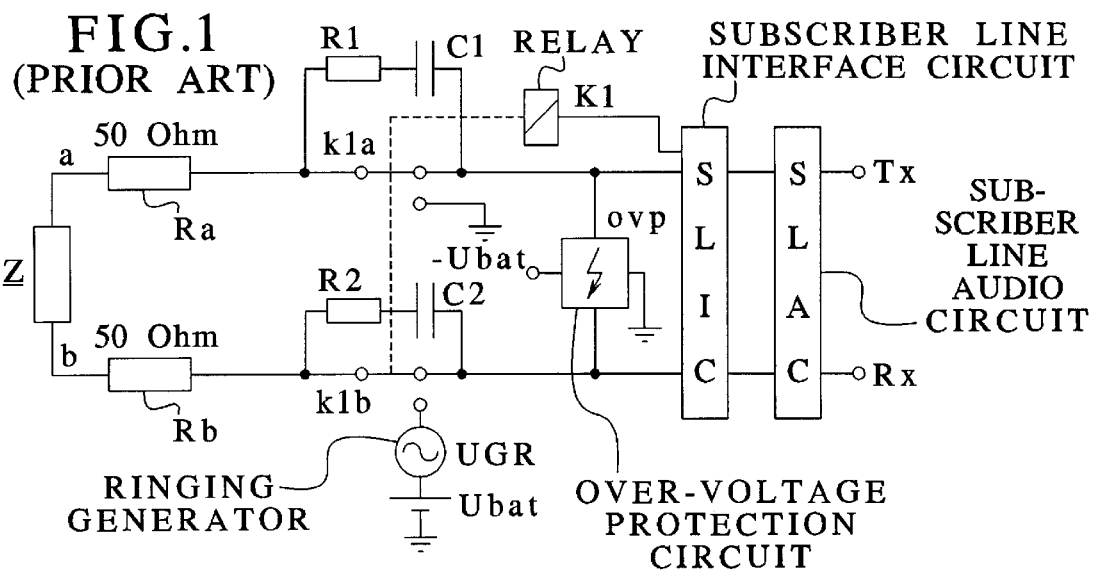
FIGS. 1–4 depict various prior art protection circuits.
Figure 2:
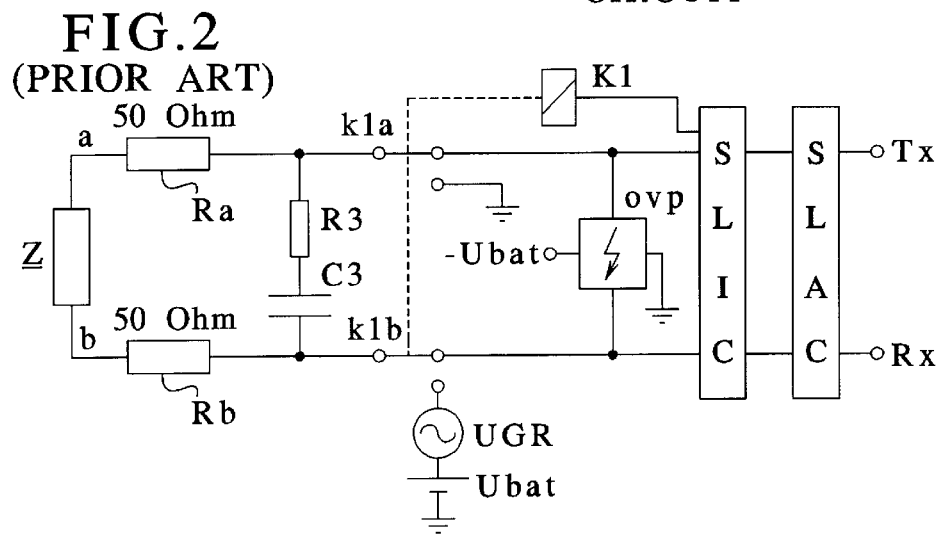
Figure 3:
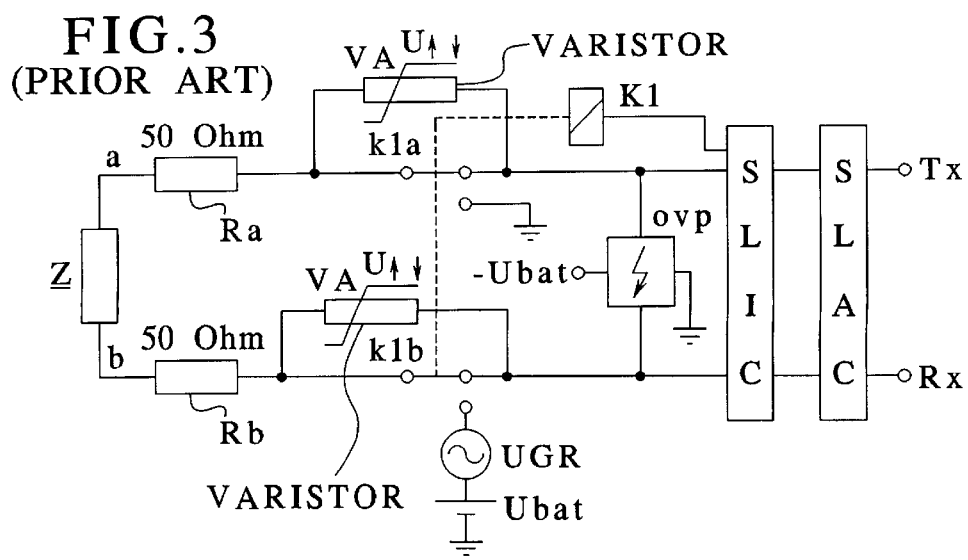
Figure 4:
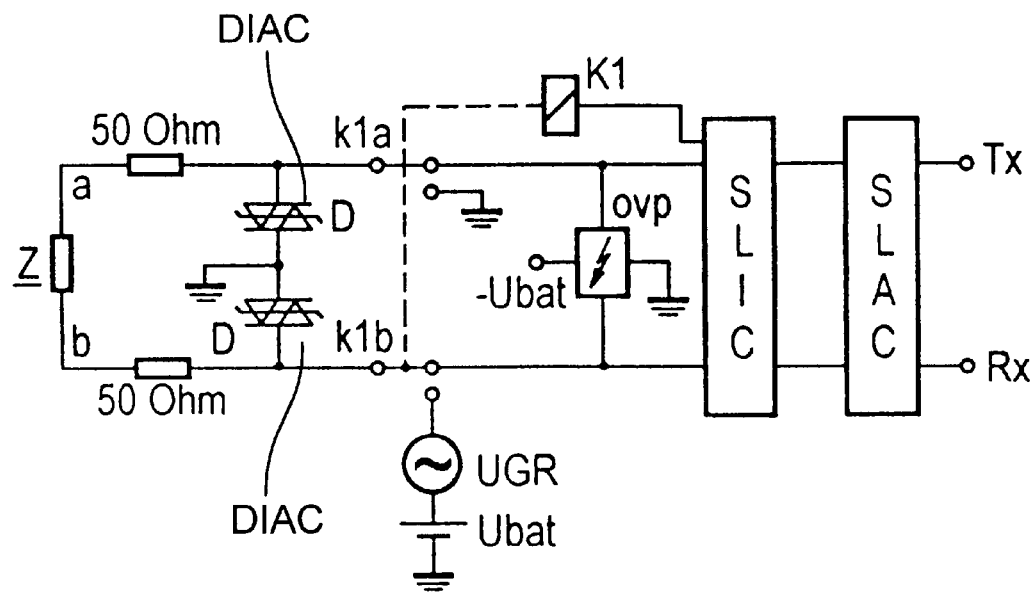
Figure 5:
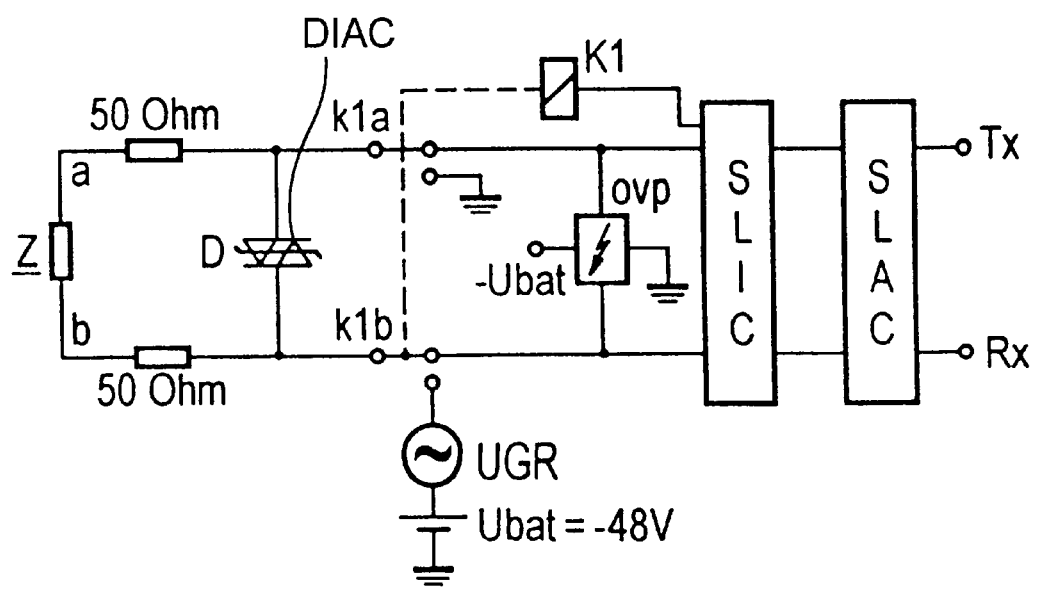
FIG. 5 depicts a protective circuit according to the present invention.

FIG. 5 of the drawing shows an exemplary embodiment of the inventive circuit arrangement, whereby a diac D that is connected between the leads a and b of the subscriber line at the subscriber side of the relay contacts k1a, k1b of the relay K1 is employed as a two-way threshold circuit. When the subscriber line is reconnected to the subscriber line circuit, the switching paths of the diac D are driven into the low-impedance condition by the over-voltage that thereby arises, so that the energy stored in the inductive load of the subscriber line can be dismantled in the loop closed via the diac.

Although the present invention has been described with reference to a specific embodiment, those of skill in the art will recognize that changes may be made thereto without departing from the scope and spirit of the invention as set forth in the appended claims.

What is claimed is:

1. A circuit arrangement for protecting a subscriber circuit of a telecommunication system for the balanced-to-ground connection of a subscriber line to which a ringing voltage source is connected unbalanced to ground via an electromechanical or electronic switch upon simultaneous disconnection from the subscriber circuit for call signalling against inductive over-voltages that occur upon reconnection to the subscriber line, comprising:

a ringing voltage source having a peak voltage;

a subscriber line having leads connected to said ringing voltage source via a switch; and a two-way threshold circuit with symmetrical pass/stop characteristic whose threshold voltage is higher than the peak voltage of the ringing voltage source.

2. The circuit arrangement according to claim 1, wherein the two-way threshold circuit is a diac.

3. A circuit arrangement for protecting a subscriber circuit of a telecommunication system for the balanced-to-ground connection of a subscriber line against inductive over-voltages that occur upon reconnection to the subscriber line, comprising:

a subscriber line having leads;

a ringing voltage source connected unbalanced to ground and connected to the leads of the subscriber line via an electromechanical or electronic switch upon simultaneous disconnection from the subscriber circuit for call signaling; and a two-way threshold circuit with symmetrical pass/stop characteristic whose threshold voltage is higher than a peak voltage of the ringing voltage source that is connected between the leads of the subscriber line.

4. The circuit arrangement according to claim 3, wherein the two-way threshold circuit is a diac.

5. A circuit arrangement for protecting a subscriber circuit of a telecommunication system for the balanced-to-ground connection of a subscriber, against inductive over-voltages that occur upon reconnection to the subscriber line comprising:

a subscriber line having leads;

a ringing voltage source connected unbalanced to ground and connected to the leads of the subscriber line via a switch upon simultaneous disconnection from the subscriber circuit for call signaling; and a diac with symmetrical pass/stop characteristic whose threshold voltage is higher than a peak voltage of the ringing voltage source that is connected between the leads of the subscriber line.

* * * * *